Feb. 5, 1957   J. A. POKRYFKE   2,780,430
HOSE RACK
Filed Feb. 4, 1953

Inventor:
John A. Pokryfke
By Soans, Glaister & Anderson
Attys.

United States Patent Office 2,780,430
Patented Feb. 5, 1957

2,780,430
HOSE RACK

John August Pokryfke, Chicago, Ill., assignor to W. D. Allen Manufacturing Co., Chicago, Ill., a corporation of Illinois Application February 4, 1953, Serial No. 335,141

4 Claims. (Cl. 248—90)

This invention relates to hose racks, and more specifically a rack for hose of the type which can be collapsed to flat form and folded back and forth on itself.

The storage of such collapsible hoses for fighting fires, requires that the hose must be held in a compact arrangement which affords a quick withdrawal of the hose from the rack. Numerous rack designs have been manufactured which afford easy removal of hose and these racks have been generally satisfactory for conventional, large diameter, fire hose installation. Such racks are relatively high cost and this has prevented a more widespread installation of fire hoses, especially in residences and other places where fire hoses of smaller size than said conventional, large diameter fire hoses would be useful and where the cost is a highly important factor in determining whether or not a fire hose should be provided. The need for a readily available fire hose is at least as great in residences and other small buildings as in the larger buildings where fire hoses are generally available. The tremendous housing development in recent years has created innumerable residential sections having no organized fire protection and, consequently, there is an especially great need in the homes in such areas for a readily available, connected fire hose.

Accordingly, the main objects of the present invention are to provide an economical rack for collapsible hose, which will maintain the hose in a compact stored arrangement permitting the ready withdrawal of the hose without any danger of fouling on the rack; to provide a hose rack of the type described which is especially suited for hose of relatively small diameter and which may be mounted on any flat surface; to provide a hose rack adapted for mounting on any flat surface and which will permit withdrawal of the hose at any angle with respect to the rack supporting surface; to provide a hose rack of the type described above which may be employed in combination with a cabinet, in a manner which affords selective installation of the cabinet for either right or left hand door opening, without changing any part of the cabinet or rack; and in general, it is the object of the invention to provide a hose rack which is very economical to manufacture, simple to install, and which is particularly adaptable for use with collapsible hose of a size suitable for use in small buildings.

Other objects and advantages of the invention will be understood by reference to the following specification and to the accompanying drawings, wherein.

Figure 1:
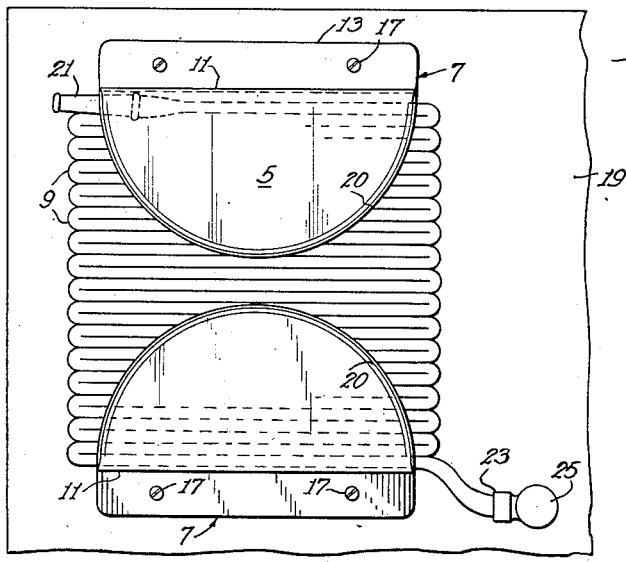
Figure 1 is a side view of the improved hose rack mounted on a wall.
Figure 2:
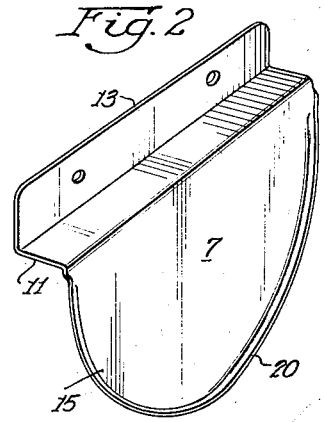
Figure 2 is a perspective view of one of two similar brackets used in the improved rack.

The improved hose rack 5 shown in the drawing, comprises a pair of similar brackets 7 which are preferably made of sheet metal, although they may obviously be made of other suitable materials. As will be more apparent as the disclosure progresses, the brackets 7 are adapted for positioning on any generally flat surface in a manner which permits easy withdrawal of a hose 9 in any direction away from the bracket supporting, flat surface.

Each of the hose retaining brackets 7 comprises a central web 11, having a width substantially equal to that of the flattened hose to be stored, a short flange 13, and a relatively deep flange 15 which is preferably of arcuate or semi-circular shape. The flanges extend in opposite directions at right angles to the web portion 11 in order that the short flange 13 may be fastened, as by screws 17, to a wall 19 or other surface, and the deeper flange 15 will then extend in generally parallel relation to the wall.

As shown in Figure 1, the hose retaining brackets 7 are disposed in generally aligned, vertically spaced apart relation with their deeper flange portions 15 extending toward each other, to thereby provide a hose rack having horizontal shelf portions provided by the webs 11 and means for preventing lateral displacement of the hose comprising the wall 19 and the relatively deep, semi-circular flanges 15. The brackets are preferably disposed so that the flanges 15 are spaced apart, at their free end portions, sufficiently to permit the passage of a section of the hose therebetween.

The brackets 7 are formed of relatively light weight metal and, consequently, can be easily made in a stamping operation. The hose retaining flange 15 should be sufficiently stiff to normally prevent lateral displacement of the hose and, in this respect, the addition of a peripheral crimp or reinforcing web 20 makes possible the use of a very light piece of sheet metal.

The fire hose 9 used to illustrate the utility of the subject invention is of linen or other suitable textile fabric construction, or of Fiberglas, plastic material or the like or combinations thereof, which can be collapsed to flat form and folded back and forth on itself as shown in Figure 1. A nozzle 21 is preferably permanently attached to one end of the hose and a suitable coupling 23 is provided at the other end for connection with an adjacent faucet or hydrant 25. The brackets 7 are so spaced that when the hose is folded upon itself in a stacked arrangement, the folded hose together with the nozzle 21 will be snugly received between the horizontal portions 11 of the brackets with the nozzle at the upper end of the stack.

The nozzle 21 may be of the ordinary fixed-opening fire hose type, but in the particular adaptation of the unit described to a small diameter hose it is preferred that the nozzle be of a variable spray, closable or shut off type. Thus, with a hose of approximately ¾ inch in diameter and a variable spray nozzle there is provided an effective, light-weight fire hose which may be used at any point in a residence without discharging water while taking the hose to and from the scene of a fire.

From the foregoing description it is seen that there is provided a simple, economical means for storing a collapsible hose, such as a fire hose, in a position of readiness for use. It will be noted from Figure 1 that the hose retaining brackets afford an open-end rack end, consequently, the hose can be easily withdrawn from either end of the rack. Furthermore, the arcuate shape of the edge of this flange permits the withdrawal of the hose from the rack at any angle with respect to the flat surface supporting the brackets. The flange edge presents no obstructing corners and, consequently, the hose is free to slide over the entire length of the edge, if necessary, to assume the direction of withdrawal. It will be noted, however, that if the hose should stick in the rack for some unforseen reason, the flange 15 is sufficiently light to yield under pressure and will bend outwardly to free the hose.

Figure 3:
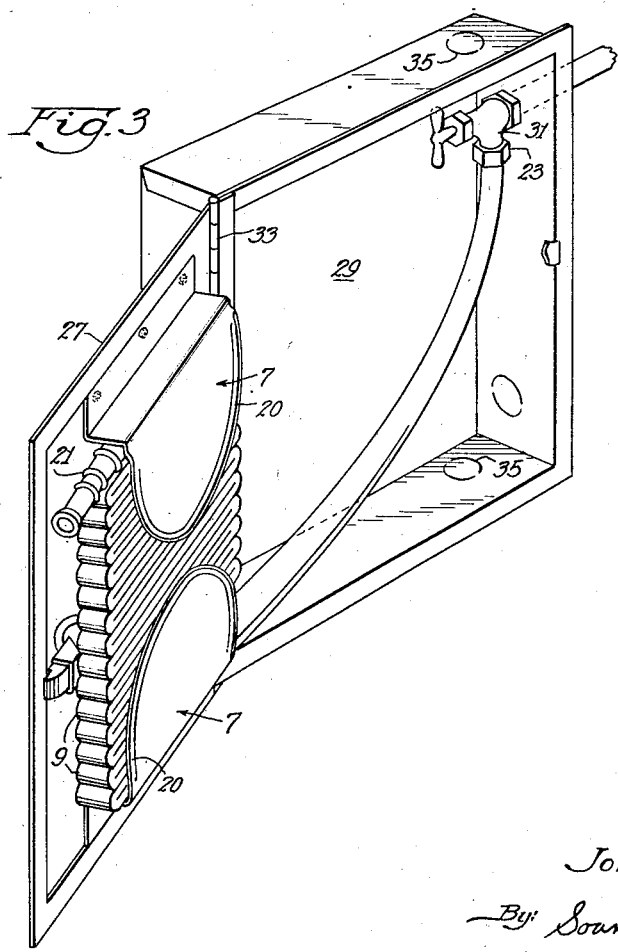
Figure 3 is a perspective view of the improved hose rack as used in connection with a cabinet which is opened to reveal the arrangement of the rack on the cabinet door.
Figure 4:
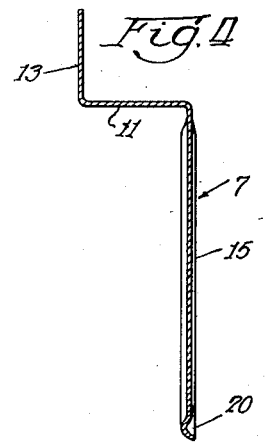
Figure 4 is an enlarged cross-sectional view taken through the midportion of one of the brackets.

Referring to Figure 3 it is seen that the present invention is readily adapted for mounting on a hinged panel, such as the door 27 of a cabinet 29. It will be noted that in such case the open-end construction of the rack and the utilization of a pair of similar brackets provides a hose rack which is usable with either a right-hand or left-hand door without change.

In the illustrated cabinet 29 for storing hose in readily accessible position for withdrawal at any angle, further advantage is taken of the features of the disclosed hose rack 5 by constructing the cabinet so that it may be hung with the door opening either to the left or the right, as desired. To mount the cabinet with the hinge at the opposite or right-hand side, no change in the construction or assembly of parts is required, it being merely necessary to invert the cabinet so as to place the hinge at the right-hand side. In either case the hose will, of course, be stacked with the nozzle end at the top. Although not essential to the utility of such a cabinet, it is preferred that the end of the hose, which is coupled to a faucet 31 projecting into the cabinet 29, extend from the lower bracket 7 adjacent the door hinge 33 to the faucet at the opposite side of the cabinet. The coupled end of the hose does not interfere with the opening and closing of the door or the withdrawal of the hose when thus arranged. Knock-out portions 35 are preferably provided in the cabinet to provide for connection of the faucet 31 to a water pipe extending through a side of the cabinet. The cabinet may be made to be set in a recessed portion of the wall or to project from the wall, as desired.

It is believed that it is apparent from the foregoing description that apparatus constructed in accordance with the present invention affords definite advantages in its adaptability to use on almost any plane surface, and in providing for easy withdrawal of the hose at substantially any angle with respect to the hose rack. Furthermore, there is provided a hose rack which is extremely simple in construction and consequently may be produced very economically. This latter feature is a particularly important factor in presenting economical fire-protection to the owners of residences and other small buildings, who are generally unable or unwilling to stand the expense of the larger, standard fire hose.

While described with respect to particular apparatus, it is not intended to thereby limit the invention since other modifications may be made without departing from the principles of the invention.

I claim:

1. A fire protection hose rack comprising a normally vertical supporting panel, a pair of brackets attached to said panel, one of said brackets being positioned in vertically overlying relation to the other, each of said brackets having a substantially horizontally disposed shelf part which extends laterally from said panel, mounting means extending rigidly from one edge of said shelf part and secured to said panel, and a hose retaining member which extends from the opposite edge of said shelf part in spaced, approximately parallel relation to said panel, said hose retaining members being disposed in approximately coplanar relation to each other and being of a vertical depth substantially in excess of the panel-to-retaining-member dimension of the shelf part so as to be operative to retain a hose stack of substantial depth on the shelf part of the lowermost bracket and in the space between said panel and said retaining members, the mutually adjacent ends of said retaining members being spaced from each other to facilitate insertion of a hose between said ends into said space and being continuously convex from side to side of the retaining members between points adjacent to the respective shelf parts from which said retaining members extend, said convex ends serving to facilitate possible withdrawal of a hose from said space across said convex ends.

2. A fire protection hose rack comprising a normally vertical supporting panel, a pair of brackets attached to said panel, one of said brackets being positioned in vertically overlying relation to the other, each of said brackets having a substantially horizontally disposed shelf part which extends laterally from said panel, mounting means extending rigidly from one edge of said shelf part and secured to said panel, and a hose retaining member which extends from the opposite edge of said shelf part in spaced, approximately parallel relation to said panel, said hose retaining members being disposed in approximately coplanar relation to each other and being of a vertical depth substantially in excess of the panel-to-retaining-member dimension of the shelf part so as to be operative to retain a hose stack of substantial depth on the shelf part of the lowermost bracket and in the space between said panel and said retaining members, the mutually adjacent ends of said retaining members being spaced from each other to facilitate insertion of a hose between said ends into said space and being continuously convex from side to side of the retaining members between points adjacent to the respective shelf parts from which said retaining members extend, said convex ends serving to facilitate possible withdrawal of a hose from said space across said convex ends, and said retaining members having ribs along their convex edges to reinforce the end portions of said retaining members, said ribs having transversely convex surfaces facing at least partially into said space to further facilitate possible withdrawal of a hose across said ends as aforesaid.

3. A fire protection hose rack comprising a normally vertical cabinet door, a pair of brackets attached to said door, one of said brackets being positioned in vertically overlying relation to the other, each of said brackets having a substantially horizontally disposed shelf part which extends laterally from said door, mounting means extending rigidly from one edge of said shelf part and secured to said door, and a hose retaining member which extends from the opposite edge of said shelf part in spaced, approximately parallel relation to said door, said hose retaining members being disposed in approximately coplanar relation to each other and being of a vertical depth substantially in excess of the door-to-retaining-member dimensions of said shelf parts so as to be operative to retain a hose stack of substantial depth on the shelf part of the lowermost bracket and in the space between said door and said retaining members, the mutually adjacent ends of said retaining members being spaced from each other to facilitate insertion of a hose between said ends into said space, said brackets being selectively operative as the lowermost bracket whereby said door is adapted to be provided with axially vertical hinge mounting means at one side and inverted to change the hinge mounting from left hand to right hand and vice versa.

4. A fire protection hose rack comprising a normally vertical cabinet door, a pair of brackets attached to said door, one of said brackets being positioned in vertically overlying relation to the other, each of said brackets having a substantially horizontally disposed shelf part which extends laterally from said door, mounting means extending rigidly from one edge of said shelf part and secured to said door, and a hose retaining member which extends from the opposite edge of said shelf part in spaced, approximately parallel relation to said door, said hose retaining members being disposed in approximately coplanar relation to each other and being of a vertical depth substantially in excess of the door-to-retaining-member dimensions of said shelf part so as to be operative to retain a hose stack of substantial depth on the shelf part of the lowermost bracket and in the space between said door and said retaining members, the mutually adjacent ends of said retaining members being spaced from each other to facilitate insertion of a hose between said ends into said space, and said retaining members being bendable away from said door by forces applied to said members by a hose withdrawn from the rack across the edges of said retaining members, and said door being provided with axially vertical hinge mounting means at one side and said brackets being selectively operative as the lowermost bracket whereby said door with said brackets attached thereto is invertable to change said hinge mounting means from left hand to right hand and vice versa.

References Cited in the file of this patent

UNITED STATES PATENTS

| | | |
|---|---|---|
| D.162,122 | Broeren | Feb. 27, 1951 |
| 933,947 | Allen | Sept. 14, 1909 |
| 2,434,140 | Bernstein | Jan. 6, 1948 |
| 2,686,644 | Pratt | Aug. 17, 1954 |

FOREIGN PATENTS

| | | |
|---|---|---|
| 59,250 | Denmark | of 1941 |
| 623,855 | Great Britain | of 1949 |
| 794,460 | France | of 1936 |